March 4, 1958     B. WALKER     2,825,578
REMOTELY CONTROLLED AUXILIARY SPRING SUSPENSION
Filed Oct. 5, 1953     2 Sheets-Sheet 1
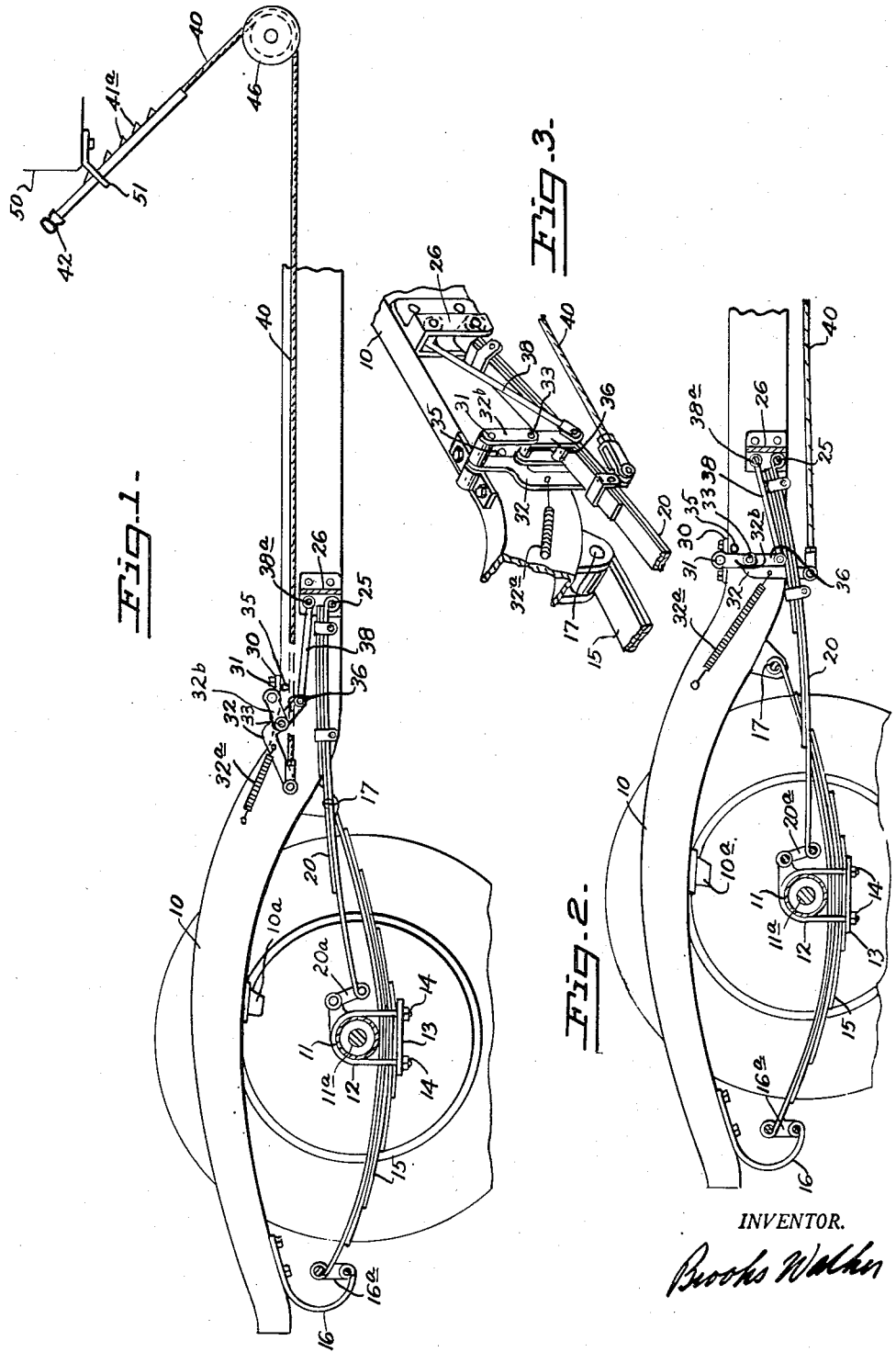
INVENTOR.
Brooks Walker March 4, 1958 B. WALKER 2,825,578
REMOTELY CONTROLLED AUXILIARY SPRING SUSPENSION
Filed Oct. 5, 1953 2 Sheets-Sheet 2
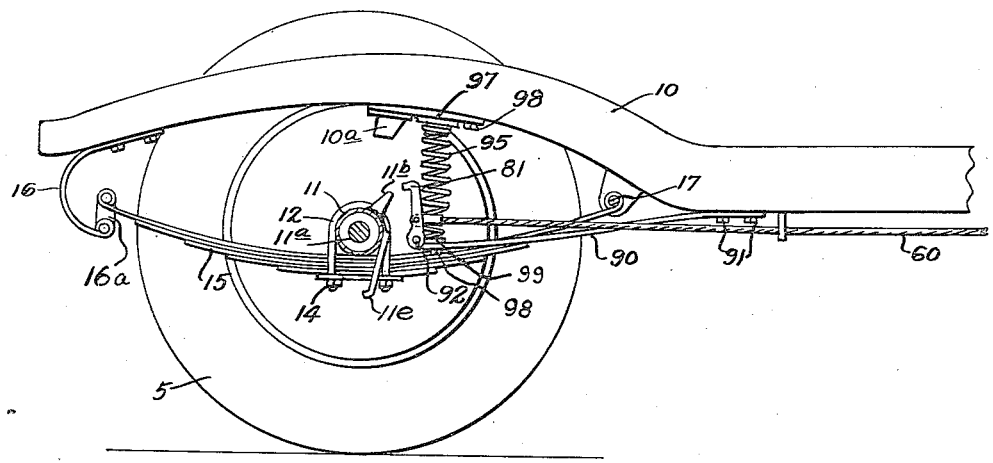
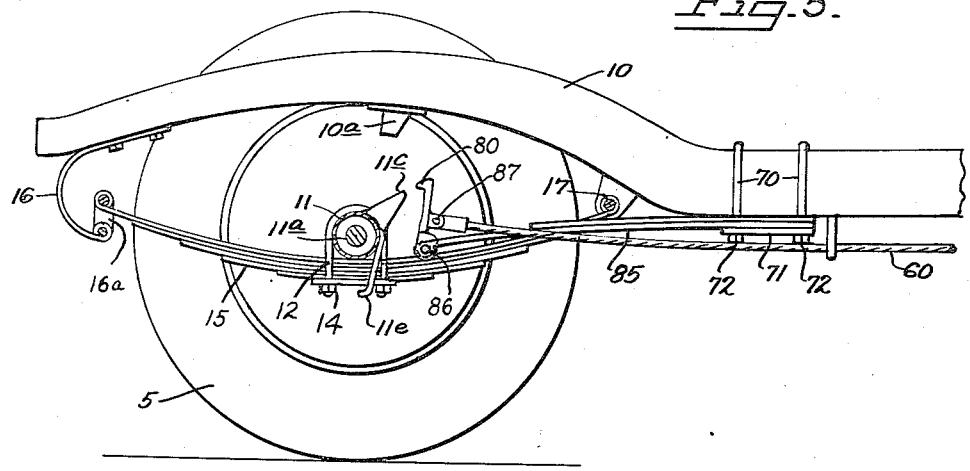
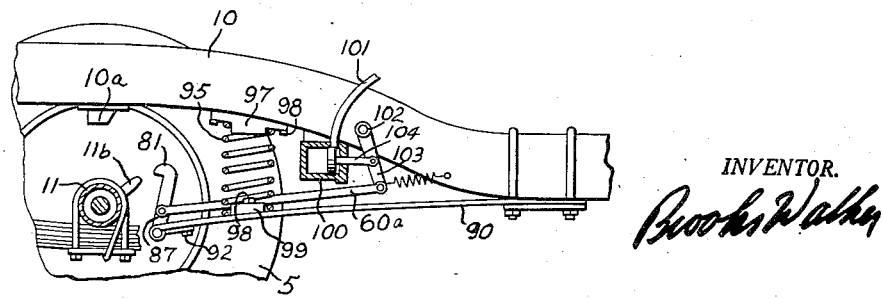
INVENTOR.
Brooks Walker

United States Patent Office 2,825,578
Patented Mar. 4, 1958

2,825,578

REMOTELY CONTROLLED AUXILIARY SPRING SUSPENSION

Brooks Walker, Piedmont, Calif.

Application October 5, 1953, Serial No. 384,083

4 Claims. (Cl. 280—124)

This invention pertains to auxiliary vehicle suspension and improvements therein. Heretofore, auxiliary springs have been provided on trucks and some buses which go into action after the basic springs have been compressed a certain amount. Thus, when carrying a light load, the auxiliary springs interferred with normal easy riding and full spring action. With passenger vehicles of larger capacity, such as station wagons, air line limousines, some six-passenger sedans, buses, pickups, trucks, etc., the amount of load carried varies substantially. When lightly loaded a low spring rate (in pounds per inch of action) is desirable, compared to a higher spring rate when the vehicle is heavily loaded. In my U. S. Patent No. 2,518,733, dated August 15, 1950, one method of accomplishing this auxiliary support has been shown—wherein the auxiliary support is connectable or disconnected by the operator. This invention pertains to improvements in the design of such auxiliary supports which can be more easily installed on existing vehicles or built into such vehicles as originally produced. It offers some economy in weight and eliminates the necessity of transferring the control from the two auxiliary springs up over the drive shaft or pinion housing (as shown in said U. S. Patent No. 2,518,733) where the clearance on some modern designs of cars may be rather restricted.

One form of the design, as shown in this invention, involves a cantilever type of spring, in which the light end is shackled to the axle permanently, and the other end—instead of being anchored—is free to move without spring resistance when in the inactive position and is manually loaded and mechanically locked in the loaded position of the auxiliary springs. By this same construction, in which a toggle is used for loading, manual means for actuating the same as through a control similar to a handbrake pull handle operating through a cable linkage can not only engage the auxiliary spring when desired but can also effect some initial loading of the auxiliary spring, so that with the normal heavier load in the vehicle the rear axle to rear frame clearance will be maintained more nearly the same in clearance as is true when the vehicle is lightly loaded.

Other features of the invention include a means whereby a coil spring which is very economical of weight for the amount of spring support provided is capable of being anchored to the vehicle frame at one end and to a locating leaf at its lower end, with a linkage that connects or disconnects the locating leaf with the rear axle.

Other objects and features of novelty of the invention will be specifically pointed out, or will become apparent when referring, for a better understanding of the invention, to the following description taken in conjunction with the accompanying drawings, wherein:

Fig. 1 is a side elevation, partly cut away, of a portion of a vehicle showing one form of the invention.

Fig. 2 is a side elevation, partly in section and partly cut away, showing a portion of a vehicle including another position of the invention, shown in Fig. 1.

Fig. 3 is a perspective view of a portion of the linkage as shown in Figs. 1 and 2, showing the auxiliary spring in the load carrying position and in larger scale.

Fig. 4 is a side elevation of a portion of a vehicle illustrating another form of the invention.

Fig. 5 is a side elevation of the similar portion of a vehicle, showing still a third form of the invention.

Fig. 6 is a cut away, schematic view showing a portion of the construction shown in Fig. 4 with a different form of actuation.

In all figures, like numerals of reference refer to the corresponding parts in various drawings.

In Figs. 1, 2, and 3 I have shown a vehicle frame 10, a rubber axle bumper 10a, a rear axle housing 11 carrying a rear axle 11a, which is secured to rear main spring 15 by U-bolts 12, spring bottom plate 13, and U-bolt nuts 14. Shackle hanger 16 carries rear spring shackle 16a at the rear of main supporting spring 15, while the front end of the spring is pivoted to the frame by hanger bolt 17. A bracket 30 is secured to the frame which carries overhung bolt 31, to which is pivotally mounted a toggle which includes manually operated upper links 32 and 32b and lower link 36. Pin 33 joins the lower link 36 to the upper toggle links 32 and 32b. The lower end of toggle link 36 is pivotally secured to the car frame 10 by link 38. Spring 32a constantly urges manually controlled link 32 into the position shown in Fig. 1 in which the lower link 36 is out of contact with the auxiliary spring 20. Stop 35 limits the action of toggle link 32. Auxiliary spring 20 has an eye at each end of the lower leaf, the rear eye of which carries the shackle 20a that links the rear end of the auxiliary spring to the rear axle housing 11. The eye at the front end of the main leaf of the auxiliary spring 20 is pivoted at bolt 25, which bolt 25 is mounted in spring hanger bracket 26. Spring hanger bracket 26 also carries pivot bolt 38a on which drag link 38 is pivoted so as to guide the lower end of toggle link 36. A manual control in the driver's compartment such as handle 42 supported on the instrument panel 50 by bracket 51 can be pulled upwardly by the driver so that notches 41a engage bracket 51. A cable 40 attached to a handle 42 passes around pulley 46 to pull on the lower end of toggle arm 32 which extends well past pivot bolt 33 that joins link 32 to link 36 of the toggle so that the toggle can be pulled into the slightly past center position as shown in Figs. 2 and 3. In the position, as shown in Figs. 2 and 3, the straightening out of the toggle links 33 and 36 causes auxiliary spring 20 to become active and actually carries an appreciable load if desired, or by adjusting the design of the spring 20, the location of bearing pivot point 25 and the other related parts, the auxiliary spring can just start to pick up load when the toggles 32 and 36 are straightened out, as shown in Figs. 2 and 3. When the manual control 42 releases the tension on cable 40 by disengaging the notches 41a spring 32a retracts the toggle to the position shown in Fig. 1 when there is an appreciable clearance between the auxiliary spring 20 and the lower contact point between the spring 20 and the toggle arm 36, so that essentially no support is provided by the auxiliary spring in the inactive position, as shown in Fig. 1.

In Fig. 4 I have shown a different construction in which the auxiliary spring load is largely carried by coil spring 95 which is anchored to bracket 97 by bolts 98 which secure bracket 97 to the vehicle frame 10. The lower end of coil spring 95 is secured by bracket 99 which may preferably screw inside the coil spring to anchor and locate it. Bracket 99 is secured by bolts 98 to spring leaf 90. Spring leaf 90 is fastened to the frame 10 just forward of spring hanger bolt 17 by bolts 91 or by U-bolts around the frame similar to the construction shown in Fig. 5. At the rear end of spring 90 is an eye in which is inserted a rubber bushing and a bolt 92 which carries hook 81. The rubber bushing urges the hook 81 through torsion into an engagement with lug 11b and is retracted by cable 60 to the inactive auxiliary spring position, as shown in Fig. 4. When cable 60 is released as by a manual control, such as is shown in Fig. 1 of this application or by a mechanism such as is shown in my issued U. S. Patent No. 2,518,733, the torsion of the rubber bushing at bolt 92 urges hook 81 rearwardly to engage lug 11b on the axle. A projection or guide 11e extends from lug 11b downwardly to near the bottom of nuts 14 which secure U-bolts 12 to tie the axle housing 11 to the rear springs 15. This guide or guard 11e prevents hook 81 from getting caught under the axle when the car is heavily loaded and the tension in cable 60 is released. Under such circumstances, when the car first goes over a heavy bump and the axle drops down even with a heavy load due to the bump the hook 81 will engage bracket 11b and from then on the auxiliary springs will be in the operating position.

In Fig. 5 I have shown a slightly modified construction in which a cantilever type of spring 85 is secured to the subframe by U-bolts 70, cross pieces 71, and nuts 72 on the bottom of vehicle frame 10. A bolt 86 is located in the eye at the rear end of the main leaf of spring 85 and this carries a rubber bushing which urges hook 80 rearwardly so as to engage lug 11c which is attached to the rear axle housing 11. The guide or guard 11e acts in a similar manner to that described in connection with 11e of Fig. 4. Cable 60 is secured to hook 80 by pin 87 and is preferably actuated from the driver's compartment. The advantage of this construction is that the entire auxiliary spring of the cantilever type is carried as sprung weight by the vehicle body, is readily attached to the frame by two U-bolts, and no auxiliary mounting for the upper end of the coil spring is needed as is the case in Fig. 4.

From the above descriptions it can be seen that various designs have been provided wherein an auxiliary spring may be carried by the frame at either side of the car and can be engaged or become effective as a supporting medium at the will of the driver. No major cross piece or interconnection between the auxiliary springs is necessary in the form of a cross shaft, as is shown in my issued Patent No. 2,518,733 previously referred to. The construction on each side of the rear of the car or even at the front wheel suspension on the vehicle could be similar or identical, so that cables running to the operating or connecting linkages at each spring are all that are necessary. Small hydraulic cylinders, such as brake cylinders, might also be used and the entire system could be quite similar to the hydraulic braking system if that were thought more desirable than the cable linkages shown. This construction is shown in Fig. 6, in which the actuating rod 60a is actuated by a fluid actuated cylinder 100 which is connected through line 101 to a hand or foot operated pump, such as is shown in my co-pending application, Ser. No. 394,244, or by an engine driven pump, such as is described in my pending case Ser. No. 402,532, now Patent No. 2,743,941, dated May 1, 1956. The piston of cylinder 100 is connected by link 104 to rocker link 103, one end of which is pivoted to the vehicle frame at pivot 102 and the other end is attached to rod 60a. When fluid pressure enters through line 101 rod 60a is pulled backwards to retract hook or detachable shackle 81 from engagement with lug 11b shown on axle 11. The cable linkages from one side of the vehicle to the other are in the form of a Y connection from the manual control running to each side of the rear of the car or with a pulley to similar installations at the front of the car.

Where I have used the terms "frame" and "body" they may be separate or integral.

Applicant does not wish to limit this invention in any way to the details or mode of operation set forth in this specification and drawings, for it will be obvious that wide departure may be made in the way of details without departing from the spirit and scope of this invention which is set forth in the following claims.

I claim as my invention:

1. A vehicle having a frame, a body, a driver's compartment, wheels for supporting said vehicle, a structure on which said wheels rotate, resilient means for supporting said vehicle on said structure, auxiliary resilient means carried by said frame, a shackle linkage securing one end of said auxiliary means to said structure when in the load carrying position, manual means operable from said driver's compartment to disconnect said shackle from said structure, said auxiliary means including a coil spring secured at its upper end to the vehicle frame and secured at its lower end to an element which is attached to the vehicle frame substantially ahead of said coil spring, the rear end of said element carrying said shackle.

2. A vehicle having a frame, wheels for supporting said frame, a structure on which said wheels rotate, resilient means for supporting said vehicle on said structure, auxiliary resilient means operable into a position to aid in the support of said vehicle or to render substantially no support to said vehicle, means operable from the inside of said vehicle body effecting said change in said auxiliary means, said auxiliary means including a coil spring, the top of said coil spring being secured to said vehicle frame, the bottom of said coil spring being secured to a locating element, the forward end of said locating element being secured to said frame, the rear end of said locating element carrying a linkage which can be connected or disconnected with said structure on which said wheels rotate by the operator of said vehicle by a manual control.

3. A vehicle having a frame, wheels for supporting said frame, a structure on which said wheels rotate, resilient means for supporting said vehicle on said structure, auxiliary resilient means operable into a position to aid in the support of said vehicle or to render substantially no support to said vehicle, means operable from the inside of said vehicle body effecting said change in said auxiliary means, said auxiliary means including a coil spring, the top of said coil spring being secured to said vehicle frame, the bottom of said coil spring being secured to a locating element, the forward end of said locating element being secured to said frame, the rear end of said locating element carrying a linkage which can be connected or disconnected with said structure on which said wheels rotate by the operator of said vehicle by a manual control from within said vehicle.

4. A vehicle having a frame, wheels for supporting said frame, a structure on which said wheels rotate, resilient means for supporting said vehicle on said structure, auxiliary resilient means operable into a position to aid in the support of said vehicle or to render substantially no support to said vehicle, means operable from the inside of said vehicle body effecting said change in said auxiliary means, said auxiliary means including a coil spring, the top of said coil spring being secured to said vehicle frame, the bottom of said coil spring being secured to a locating element, the forward end of said locating element being pivoted to said frame, the rear end of said locating element carrying a linkage which can be connected or disconnected with said structure on which said wheels rotate by the operator of said vehicle by a manual control, said control including a handle operable by said operator.

References Cited in the file of this patent

UNITED STATES PATENTS

| | | |
|---|---|---|
| 1,811,514 | Matakovich | June 23, 1931 |
| 1,856,764 | Hug | May 3, 1932 |
| 2,224,717 | Austin | Dec. 10, 1940 |
| 2,298,372 | Ham | Oct. 13, 1942 |
| 2,304,780 | Fries | Dec. 15, 1942 |
| 2,518,733 | Walker | Aug. 15, 1950 |